(No Model.)
E. W. FURRELL.
PICTURE FRAME.
No. 561,075.
Patented May 26, 1896.
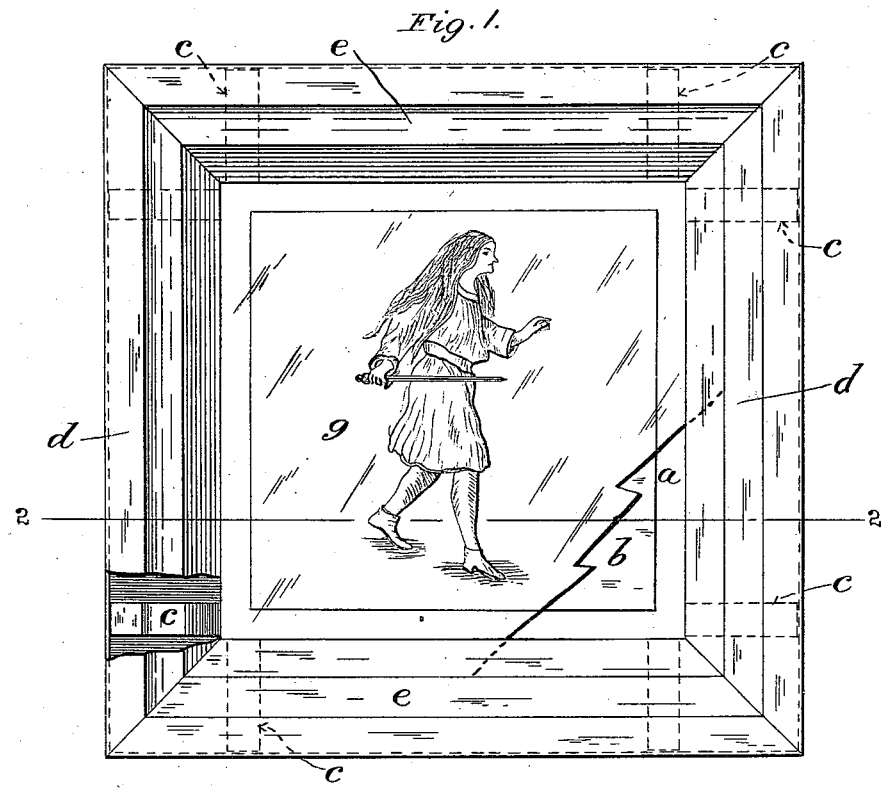
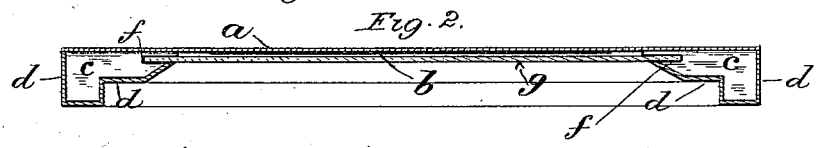
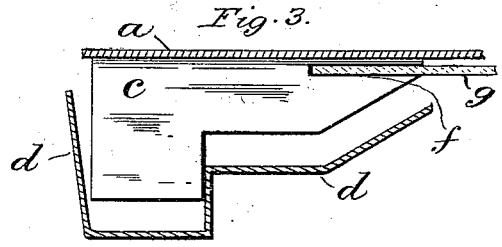
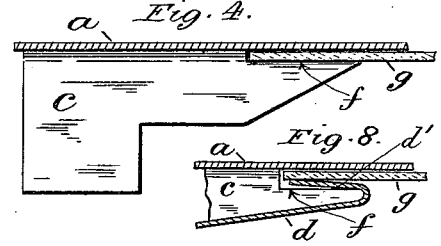
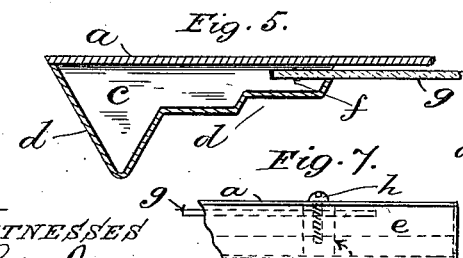
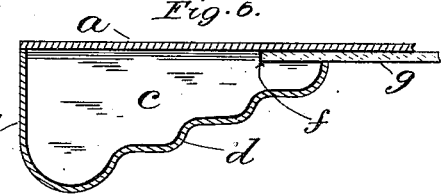
Witnesses
Geo Bray
M. L. Hale.
Inventor
Edward W. Furrell

UNITED STATES PATENT OFFICE.

EDWARD W. FURRELL, OF ST. LOUIS, MISSOURI.

PICTURE-FRAME.

SPECIFICATION forming part of Letters Patent No. 561,075, dated May 26, 1896.

Application filed October 21, 1895. Serial No. 566,350. (No model.)

*To all whom it may concern:*

Be it known that I, EDWARD W. FURRELL, a subject of the Queen of Great Britain, residing at St. Louis, in the State of Missouri, have invented a new and useful Improvement in Picture-Frames, of which the following is a specification.

My invention has for its object principally to provide a light, handsome, and inexpensive picture-frame specially adapted to the cheaper class of pictures for enlivening the homes of the poor who are unable to obtain the more expensive and elaborate frames in ordinary use.

The invention consists in features of novelty, as hereinafter described and claimed, reference being had to the accompanying drawings, forming part of this specification, whereon—

Figure 1 is a front view of my improved picture-frame, partly broken away; Fig. 2, a horizontal section thereof on line 2 2 in Fig. 1; Fig. 3, a similar view to Fig. 2, to enlarged scale, through one side of the frame, showing the front piece or molding partly detached from its holder; Fig. 4, a similar view to Fig. 3, showing a modified arrangement of part of the invention seen in Figs. 2 and 3; Figs. 5 and 6, similar views to Fig. 3, showing various forms of moldings; Fig. 7, a part plan or top edge view of the frame adapted to advertising purposes; and Fig. 8, a similar view to Fig. 3, showing a modified arrangement of the molding, like letters of reference denoting like parts in all the figures.

$a$ represents a backing or mount for the picture $b$. To the face of the mount $a$, preferably at right angles therewith, along its marginal portions, are fixed brackets $c$, suitably spaced and having their outer edges or contour preferably corresponding to the cross-sectional profile of the front pieces or moldings $d\ e$ of the frame, which are supported and held in alinement, respectively and collectively, by the brackets $c$. In the inner end or edge of each bracket $c$, adjacent to the picture $b$, is formed a notch $f$ of suitable depth for receiving the marginal portions of and holding the glass $g$ in position. The notches $f$ may be located either at some distance from the mount $a$, so as to leave a pocket or space between the glass $g$ and mount $a$, as shown in Figs. 2, 3, and 5, or flush at one side with the mount $a$, as shown in Figs. 4 and 6, the glass $g$ in such case bearing against the picture $b$.

In the manufacture of the frame I preferably make the backing or mount $a$ of pasteboard, to which the brackets $c$, of wood, cork, or analogous substance, are fixed by glue or otherwise. The moldings $d\ e$ are preferably made in one piece, respectively, of paper or pasteboard suitably pressed or molded to the desired shape and fixed to the outer edges of the brackets $c$ by glue or otherwise, so that the several parts of the moldings $d\ e$ closely fit and adhere firmly to the correspondingly-shaped parts of the brackets $c$; or the moldings $d\ e$ may be unattached to the brackets $c$ and attached instead to the edges or other marginal parts of the mount $a$, or each molding may be made in separate strips attached to the brackets $c$ in lieu of a single piece, as described.

The face of the moldings $d\ e$ may be covered with satin, velvet, leather, gilding, or other ornamentation or finish to the article.

When used for advertising purposes, the top molding $e$, with its attachments or brackets $c$, is made removable from the backing or mount $a$ for inserting a display-card or picture within the space between the glass $g$ and mount $a$ or for removing the card therefrom at pleasure, in which case the attachments $c$ of the molding $e$ are fixed to the mount $a$ by screws $h$, as shown in Fig. 7, or by any other removable fastening.

In Fig. 8 the molding $d$ is shown doubled over at its inner edge, the lapped portion $d'$ entering the notches $f$, so as to bear springwise against the glass $g$, thereby tightening the latter and obviating the necessity of fixing the molding $d$ along its inner edge to the brackets $c$.

By this invention a picture-frame is produced at the cost of a few cents equal in appearance to the more costly article, thereby enabling the poor to render their rooms bright and cheerful and cultivate artistic tastes. Moreover, with a frame of this description the cheap but meritorious newspaper and other illustrations can be utilized.

What I claim as my invention, and desire to secure by Letters Patent, is—

1. A picture-frame, consisting of a backing or mount for the picture, brackets fixed marginally to the mount, and the front pieces or moldings supported by the brackets, substantially as described.

2. A picture-frame, consisting of a backing or mount for the picture, brackets fixed marginally to the mount, and the front pieces or moldings fixed to the brackets, the said brackets having notches for holding the glass, substantially as described.

3. A picture-frame, consisting of a backing or mount for the picture, brackets fixed marginally and at right angles to the mount, and the front pieces or moldings fixed to the brackets or adjacent part of the mount, the said brackets having notches for holding the glass, and having their contour corresponding to, and engaging that of the said moldings, substantially as described.

4. As an article of manufacture, a picture-frame composed of a pasteboard backing or mount having brackets of wood, or analogous material, and the front pieces or moldings, of pasteboard fixed to the brackets or to the adjacent parts of the mount, the said brackets having notches for holding the glass, substantially as described.

EDWARD W. FURRELL.

Witnesses:
ERNEST J. LUNNON,
K. POLLARD.